(12) United States Patent
Aiuchi et al.

(10) Patent No.: US 10,732,638 B2
(45) Date of Patent: Aug. 4, 2020

(54) SUB-MOBILITY DEVICE CHARGING SYSTEM FOR VEHICLE

(71) Applicant: SUBARU CORPORATION, Tokyo (JP)

(72) Inventors: Yuji Aiuchi, Tokyo (JP); Katsumi Kikuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 298 days.

(21) Appl. No.: 15/949,820

(22) Filed: Apr. 10, 2018

(65) Prior Publication Data

US 2018/0314263 A1 Nov. 1, 2018

(30) Foreign Application Priority Data

Apr. 28, 2017 (JP) ................. 2017-089151

(51) Int. Cl.
*G05D 1/02* (2020.01)
*A61G 3/08* (2006.01)
(Continued)

(52) U.S. Cl.
CPC ......... *G05D 1/0217* (2013.01); *A61G 3/0808* (2013.01); *B60L 58/20* (2019.02);
(Continued)

(58) Field of Classification Search
CPC ............... G05D 1/0217; G05D 1/0291; G05D 2201/0206; G05D 2201/0213;
(Continued)

(56) References Cited

U.S. PATENT DOCUMENTS

2009/0236156 A1* 9/2009 Promersberger ......... B60K 6/48
180/53.4
2011/0077854 A1 3/2011 Fushiki et al.
(Continued)

FOREIGN PATENT DOCUMENTS

EP 3025897 A1 * 6/2016 ................ B60L 1/00
EP 3038227 A1 * 6/2016 ............ H02J 7/0021
(Continued)

OTHER PUBLICATIONS

Laszlo et al., "Impacts of electric vehicle chargers on the power grid," Year: 2015, Conference Paper.*
(Continued)

*Primary Examiner* — Tuan C To
(74) *Attorney, Agent, or Firm* — McGinn IP Law Group, PLLC

(57) ABSTRACT

A sub-mobility device charging system for a vehicle is capable of moving while carrying a sub-mobility device in which passengers sit. The system includes a main electric power supply unit, a main electric power receiving unit, a main battery, a main electric power supply circuit, and a controller. When external charging is required depending on a total amount of the electric power stored in the main battery of the vehicle and a sub-battery of the sub-mobility device, the controller generates or selects a traveling route to pass through a road or a point where the main electric power receiving unit can be supplied with electric power from the outside of the vehicle.

14 Claims, 10 Drawing Sheets

(51) Int. Cl.
  *A61G 5/04* (2013.01)
  *B60L 58/20* (2019.01)
  *B60L 58/12* (2019.01)
  *B60L 53/12* (2019.01)
(52) U.S. Cl.
  CPC ............ *G05D 1/0291* (2013.01); *A61G 5/04* (2013.01); *B60L 53/12* (2019.02); *B60L 58/12* (2019.02); *B60L 2200/24* (2013.01); *B60L 2240/622* (2013.01); *B60L 2260/54* (2013.01); *G05D 2201/0206* (2013.01); *G05D 2201/0213* (2013.01)
(58) Field of Classification Search
  CPC .......... B60L 58/20; B60L 53/12; B60L 58/12; B60L 2200/24; B60L 2240/622; B60L 2260/54; A61G 3/0808; A61G 5/04
  USPC ............................................................ 701/22
  See application file for complete search history.

(56) References Cited

U.S. PATENT DOCUMENTS

| | | | | |
|---|---|---|---|---|
| 2011/0084658 | A1* | 4/2011 | Yamamoto | B60L 11/1864 320/108 |
| 2011/0181123 | A1* | 7/2011 | Ichikawa | B60K 6/445 307/104 |
| 2012/0098486 | A1* | 4/2012 | Jung | H02J 5/005 320/108 |
| 2014/0117930 | A1* | 5/2014 | Imazu | B60L 53/122 320/137 |
| 2015/0231980 | A1 | 8/2015 | McCluskey et al. | |
| 2016/0114688 | A1* | 4/2016 | Koizumi | B60L 53/122 307/104 |
| 2016/0149442 | A1* | 5/2016 | Asanuma | H02J 5/005 307/104 |
| 2017/0040843 | A1* | 2/2017 | Asanuma | H02J 7/025 |
| 2017/0129357 | A1* | 5/2017 | Zheng | B60L 11/1827 |
| 2018/0054086 | A1* | 2/2018 | Jung | H01F 38/14 |
| 2018/0069440 | A1* | 3/2018 | Jung | H02J 7/02 |
| 2018/0152039 | A1* | 5/2018 | Horiuchi | H02J 7/007184 |
| 2018/0159376 | A1* | 6/2018 | Jung | H02J 50/12 |

FOREIGN PATENT DOCUMENTS

| | | | | |
|---|---|---|---|---|
| JP | H05-286437 | A | 11/1993 | |
| JP | 2004-114956 | A | 4/2004 | |
| JP | 2006-006702 | A | 1/2006 | |
| JP | 2007-139486 | A | 6/2007 | |
| JP | 2011-075382 | A | 4/2011 | |
| JP | 2013-015462 | A | 1/2013 | |
| JP | 2014090528 | A * | 5/2014 | ............ B60L 11/182 |
| JP | 2015-001466 | A | 1/2015 | |
| JP | 2016-025712 | A | 2/2016 | |
| JP | 2016-038668 | A | 3/2016 | |
| JP | 2016-097784 | A | 5/2016 | |

OTHER PUBLICATIONS

Chunhua et al., "Opportunities and Challenges of Vehicle-to-Home, Vehicle-to-Vehicle, and Vehicle-to-Grid Technologies," Year: 2013, vol. 101, Papers (249).*

Japanese Office Action, dated Apr. 2, 2019, in Japanese Application No. 2017-089151 and English Translation thereof.

* cited by examiner

SUB-MOBILITY DEVICE CHARGING SYSTEM FOR VEHICLE

CROSS-REFERENCE TO RELATED APPLICATIONS

The present application claims priority from Japanese Patent Application No. 2017-089151 filed on Apr. 28, 2017, the entire contents of which are hereby incorporated by reference.

BACKGROUND

1. Technical Field

The present invention relates to a sub-mobility device charging system for a vehicle capable of moving while carrying sub-mobility devices in which passengers sit.

2. Related Art

Conventionally, wheelchairs have been used by elderly persons and handicapped persons who have difficulty walking by themselves. In recent years, a personal mobility device such as a wheel chair capable of automatically running by an electric motor and so forth is being proposed. To realize a society where this personal mobility device becomes widespread, and therefore people having difficulty walking by themselves are easy to live active lives, it is desired that the personal mobility device is used by not only people having difficulty walking by themselves but also people who can walk by themselves. Therefore, it is important that a personal mobility device can get in a vehicle such as an automobile while a passenger sits in the personal mobility device, as an example of wheelchair disclosed in, for example, Japanese Unexamined Patent Applications No. 2006-006702 and 2004-114956.

SUMMARY OF THE INVENTION

An aspect of the present invention provides a sub-mobility device charging system for a vehicle capable of moving while carrying a sub-mobility device in which a passenger sits. The system includes: a main electric power supply unit configured to supply electric power from the vehicle to the sub-mobility device carried in the vehicle; a main electric power receiving unit configured to receive electric power from an outside of the vehicle; a main battery configured to be charged by supplying electric power to the main electric power receiving unit to the main battery; a main electric power supply circuit configured to supply the main electric power supply unit with the electric power supplied to the main electric power receiving unit or the electric power stored in the main battery; and a controller configured to control to supply the electric power from the main electric power supply circuit to the sub-mobility devices via the main electric power supply unit, and to calculate a traveling route for the vehicle running while carrying the sub-mobility devices. When external charging is required depending on a total amount of the electric power stored in the main battery of the vehicle and a sub-battery of the sub-mobility device, the controller generates or selects a traveling route to pass through a road or a point where the main electric power receiving unit can be supplied with electric power from the outside of the vehicle.

An aspect of the present invention provides a sub-mobility device charging system for a vehicle capable of moving while a carrying sub-mobility device in which a passenger sits. The system includes: a main electric power supply unit configured to supply electric power from the vehicle to the sub-mobility device carried in the vehicle; a main electric power receiving unit configured to receive electric power from an outside of the vehicle; a main battery configured to be charged by supplying electric power to the main electric power receiving unit to the main battery; a main electric power supply circuit configured to supply the main electric power supply unit with the electric power supplied to the main electric power receiving unit or the electric power stored in the main battery; and a controller configured to control to supply the electric power from the main electric power supply circuit to the sub-mobility devices via the main electric power supply unit. The controller sums an amount of charging for the main battery of the vehicle and an amount of charging for a sub-battery of the sub-mobility devices.

An aspect of the present invention provides a sub-mobility device charging system for a vehicle capable of moving while carrying a sub-mobility device in which a passenger sits. The system includes: a main electric power supply unit configured to supply electric power from the vehicle to the sub-mobility device carried in the vehicle; a main electric power receiving unit configured to receive electric power from an outside of the vehicle; a main battery configured to be charged by supplying electric power to the main electric power receiving unit to the main battery; a main electric power supply circuit configured to supply the main electric power supply unit with the electric power supplied to the main electric power receiving unit or the electric power stored in the main battery; and a controller configured to control to supply the electric power from the main electric power supply circuit to the sub-mobility device via the main electric power supply unit. The controller individually determines an amount of charging for the main battery of the vehicle and an amount of charging for a sub-battery of the sub-mobility device.

DETAILED DESCRIPTION

Figure 1:
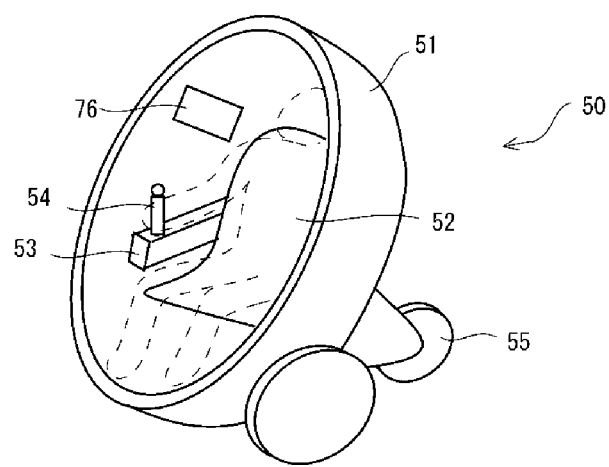
FIG. 1 is a schematic view illustrating an exemplary sub-mobility device applied to the present invention.

Hereinafter, examples of the present invention will be described with reference to the drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following examples which are not recited in a most-generic independent claim of the disclosure are optional and may be provided on an as-needed basis. The drawings are schematic and are not intended to be drawn to scale.

When a sub-mobility device is carried in a vehicle, it is preferred that the sub-mobility device can be charged in the vehicle. By this means, even when a passenger gets in the sub-mobility device insufficiently charged and starts to travel, it is possible to charge the sub-mobility device in the vehicle. Then, after getting out of the vehicle, the passenger sitting in the sub-mobility device sufficiently charged can move to a destination, and move around in the destination. With this additional value, a next-generation transportation system with organically combined sub-mobility device and vehicle becomes more convenient, and therefore increased use of the sub-mobility device is expected. However, a vehicle-mounted battery and a vehicle-mounted electric generator naturally have limited electric storage capacity and electric generating capacity, respectively. In particular, when the vehicle is an electric automobile, the battery mounted in the electric automobile tends to be limited in the capacity required to run the electric automobile, because the performance of the electric automobile is restricted by the gain of weight due to the battery. As a result, the electric power supply from the vehicle to the sub-mobility device is likely to be limited. If the electric power is supplied from the vehicle to the sub-mobility device, the amount of electric power remaining in the vehicle becomes insufficient, so that the vehicle cannot move to the destination. This situation should be avoided. Meanwhile, not so much as the vehicle, the sub-mobility device needs a relatively large amount of electric power when the sub-mobility device moves while carrying a passenger. When the electric power is supplied from the vehicle to the sub-mobility device, the amount of reduction in the electric power of the vehicle is significantly different from when, for example, an electric device such as a mobile phone is charged in the vehicle. As a result, the charging of the sub-mobility device in the vehicle may affect the running capability of the vehicle.

Therefore, for the next-generation transportation system where the sub-mobility device is carried in the vehicle, it is desirable to adequately control to supply electric power from the vehicle to the sub-mobility device.

EXAMPLE 1

FIG. 1 is a schematic view illustrating an exemplary sub-mobility device 50 applied to the present invention. As illustrated in FIG. 1, the sub-mobility device 50 has an egg-shaped body 51. A seat 52 on which a passenger sits is disposed inside the body 51. Armrests 53 are disposed on the right and left sides of the seat 52. A control lever 54 is disposed in the front end of the armrest 53. In addition, a plurality of wheels 55 are provided on the lower part of the body 51.

Figure 2:
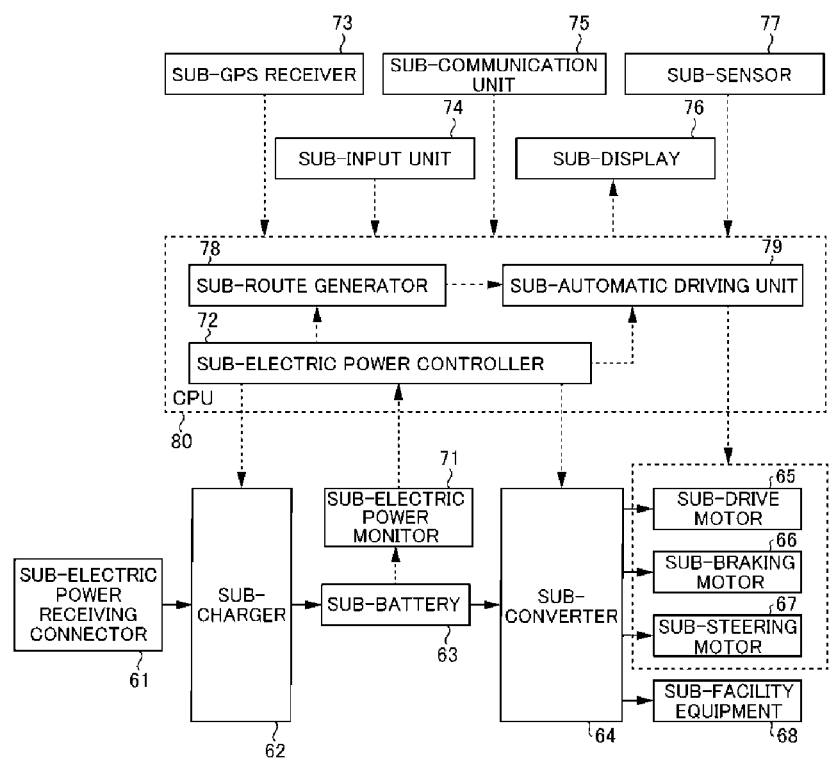
FIG. 2 illustrates an exemplary electric circuit of the sub-mobility device illustrated in FIG. 1.

FIG. 2 illustrates an exemplary electric circuit of the sub-mobility device 50 illustrated in FIG. 1. As illustrated in FIG. 2, the electric circuit of the sub-mobility device 50 includes an electric power system including a sub-electric power receiving connector 61, a sub-charger 62, a sub-battery 63, a sub-convertor 64, a sub-drive motor 65 for driving the plurality of wheels 65, a sub-braking motor 66, a sub-steering motor 67, and a sub-facility equipment 68.

The sub-electric power receiving connector 61 is coupled to, for example, a commercial electric power supply by a power cord. Electric power is supplied from the sub-electric power receiving connector 61 to the sub-charger 62, so that the sub-charger 62 charges the sub-battery 63. The sub-convertor 64 converts the electric power stored in the sub-battery 63, and supplies the converted electric power to loading devices such as the sub-drive motor 65, the sub-braking motor 66, the sub-steering motor 67, and the sub-facility equipment 68. The sub-drive motor 65 is driven to rotate the plurality of wheels 55, so that the sub-mobility device 50 can move forward or backward. The sub-steering motor 67 is driven to turn the wheels 55, so that the sub-mobility device 50 can turn to the right or the left. The sub-braking motor 66 is driven to stop the rotation of the plurality of wheels 55, so that the sub-mobility device 50 can be stopped. In this way, the sub-mobility device 50 can run carrying a passenger on the seat 52, by using the electric power stored in the sub-battery 63 charged by the sub-charger 62 supplied with the electric power from the sub-electric power receiving connector 61.

Moreover, as illustrated in FIG. 2, the electric circuit of the sub-mobility device 50 includes a control system including a sub-electric power monitor 71, a sub-electric power controller 72, a sub-GPS (global positioning system) receiver 73, a sub-input unit 74, a sub-communication unit 75, a sub-display 76, a sub-sensor 77, a sub-route generator 78, and a sub-automatic driving unit 79. The sub-electric power controller 72, the sub-route generator 78, and the sub-automatic driving unit 79 may be implemented when a CPU (central processing unit) 80 executes a program. This control system may receive the electric power from the sub-converter 64, as part of the above-described sub-facility equipment 68.

The sub-electric power monitor 71 monitors conditions of the sub-battery 63. The conditions of the sub-battery 63 include, for example, a charging voltage and a temperature. The sub-electric power controller 72 controls the sub-charger 62 and the sub-convertor 64, based on information from the sub-electric power monitor 71. For example, when the power cord is coupled to the sub-electric power receiving connector 61, and therefore the sub-charger 62 can charge the sub-battery 63, the sub-electric power controller 72 controls the charging of the sub-charger 62 until the voltage of the sub-battery 63 becomes a predetermined maximum voltage. When the voltage of the sub-battery 63 is lower than a predetermined minimum voltage, the sub-electric power controller 72 causes the sub-convertor 64 to stop the electric power conversion. In addition, when the voltage of the sub-battery 63 is equal to or lower than a voltage a little higher than the predetermined minimum voltage, the sub-electric power controller 72 causes the sub-converter 64 to reduce the electric power to be supplied to each of the loading devices. The sub-electric power controller 72 appropriately or periodically informs the sub-route generator 78 and the sub-automatic driving unit 79 of these power control states and the condition of the sub-battery 63.

The sub-GPS receiver 73 receives a radio wave from a GPS satellite. By receiving radio waves from a plurality of GPS satellites, it is possible to calculate the location of the sub-mobility device 50. The sub-input unit 74 is a device configured to receive the input operation of the passenger, and includes, for example, the above-described control lever 54. The sub-communication unit 75 communicates with a different device, such as a main communication unit 35 of an automobile 1 to transmit and receive data. In addition, the sub-communication unit 75 communicates with a base station, and therefore can acquire information on the location of the base station. The sub-display 76 is, for example, a liquid crystal device with touch panel. This touch panel may function as part of the sub-input unit 74. The sub-sensor 77 is configured to detect the location, the speed, and the surrounding environment of the sub-mobility device 50. The sub-route generator 78 receives, for example, a destination, and therefore generates a traveling route from the present location to the destination of the sub-mobility device 50. The sub-automatic driving unit 79 outputs control signals to the sub-drive motor 65, the sub-braking motor 66 and sub-steering motor 67, according to, for example, the generated traveling route. By this means, the sub-mobility device 50 can automatically move to the destination along the traveling route.

Here, to realize a society where the sub-mobility device 50 becomes widespread, and therefore people having difficulty walking by themselves are easy to live active lives, it is desired that the sub-mobility device 50 is used by not only people having difficulty walking by themselves but also people who can walk by themselves. Therefore, it is important that the sub-mobility device 50 can get in a vehicle such as the automobile 1 while a passenger sits in the sub-mobility device 50. In addition, when the sub-mobility device 50 is carried in the automobile 1, it is preferred that the sub-mobility device 50 can be charged in the automobile 1. By this means, even when a passenger gets in the sub-mobility device 50 insufficiently charged and starts to travel, it is possible to charge the sub-mobility device 50 in the automobile 1. Then, after getting out of the automobile 1, the passenger sitting in the sub-mobility device 50 sufficiently charged can move to a destination, and move around in the destination. With this additional value, a next-generation transportation system with organically combined sub-mobility and vehicle becomes more convenient, and therefore increased use of the sub-mobility device 50 is expected.

However, the main battery 14 and the electric generator which can be mounted in the automobile 1 naturally have limited electric storage capacity and electric generation capacity, respectively. In particular, when the automobile 1 is an electric automobile, the battery 14 mounted in the automobile 1 tends to be limited in the capacity required to run the automobile 1, because the performance of the electric automobile is restricted by the gain of weight due to the battery. As a result, the electric power supply from the automobile 1 to the sub-mobility device 50 may be limited. If the electric power is supplied from the automobile 1 to the sub-mobility device 50, the amount of electric power remaining in the automobile 1 becomes insufficient, so that the automobile 1 cannot move to the destination. This situation should be avoided. Meanwhile, not so much as the automobile 1, the sub-mobility device 50 needs a relatively large amount of electric power when the sub-mobility device 50 moves while carrying a passenger. When electric power is supplied from the automobile 1 to the sub-mobility device 50, the amount of reduction in the electric power of the automobile 1 is significantly different from when, for example, an electric device such as a mobile phone is charged in the automobile 1. As a result, the charging of the sub-mobility device 50 in the automobile 1 may affect the running capability of the automobile 1.

Therefore, for the next-generation transportation system where the sub-mobility device 50 is carried in the automobile 1, it is desirable to adequately control to supply electric power from the automobile 1 to the sub-mobility device 50.

Figure 3:
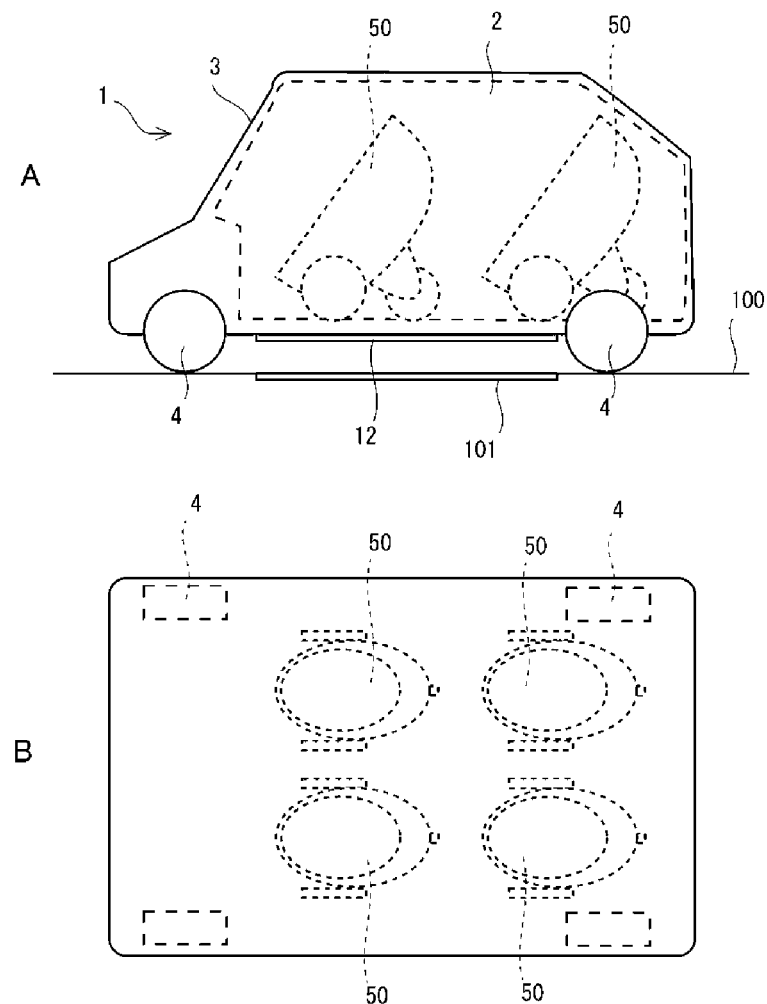
FIG. 3 is a schematic view illustrating an automobile according to an example of the present invention.

FIG. 3 is a schematic view illustrating the automobile 1 according to an example of the present invention. FIG. 3A is a side view, and FIG. 3B is a plan view. The automobile 1 illustrated in FIG. 3 includes a vehicle body 3 having a vehicle compartment 2, and wheels 4 provided on the lower part of the vehicle body 3. Four sub-mobility devices 50, each two of which are arranged in one line, are carried in the vehicle compartment 2. In addition, FIG. 3 illustrates a main electric power receiving coil 12 provided on a floor surface of the vehicle body 3, and an electric power transmission coil 101 provided on a driving lane 100 of a road surface on which the automobile 1 can run. The electric power transmission coil 101 can supply electric power to the automobile 1 running on the driving lane 100 of the road surface without contact with the automobile 1. The main electric power receiving coil 12 receives electric power supplied from the electric power transmission coil 101 located outside the automobile 1.

Figure 4:
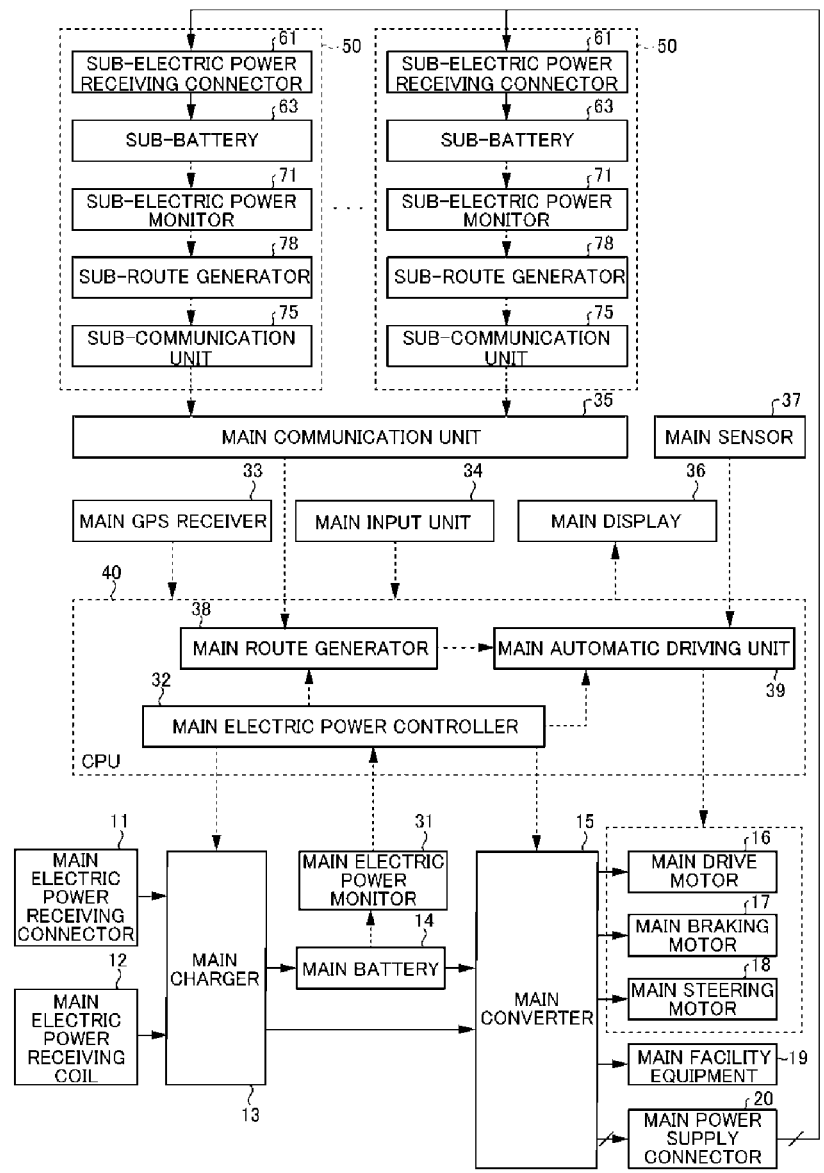
FIG. 4 illustrates an exemplary sub-mobility device charging system for the automobile illustrated in FIG. 3.

FIG. 4 illustrates an exemplary sub-mobility device charging system for the automobile 1 illustrated in FIG. 3. The automobile 1 is an example of vehicle. As illustrated in FIG. 4, the electric circuit of the automobile 1 illustrated in FIG. 3 includes an electric power system including a main electric power receiving connector 11, the main electric power receiving coil 12, a main charger 13, the main battery 14, a main converter 15, a main drive motor 16 for driving the plurality of wheels 4, a main braking motor 17, a main steering motor 18, a main facility equipment 19, and a main electric power supply connector 20.

The main electric power receiving connector 11 is used when the automobile 1 is parked, and coupled to, for example, a commercial electric power supply by a power cord. Electric power is supplied from the main electric power receiving coil 12 or the main electric power receiving connector 11 to the main charger 13, so that the main charger 13 charges the main battery 14. The main converter 15 converts the electric power stored in the main battery 14, and supplies the converted electric power to loading devices such as the main drive motor 16, the main braking motor 17, the main steering motor 18, the main facility equipment 19 and the main electric power supply connector 20. The main converter 15 supplies the electric power supplied to the main electric power receiving connector 11 and the main electric power receiving coil 12, or the electric power stored in the main battery 14, to the main electric power supply connector 20. The main electric power supply connector 20 is coupled to the sub-electric power receiving connector 61 of the sub-mobility device 50 carried in the automobile 1 by, for example, a power cord. The main electric power supply connector 20 is used to supply the electric power from the automobile 1 to the sub-mobility devices 50 carried in the automobile 1. The main drive motor 16 is driven to rotate the plurality of wheels 4, so that the automobile 1 can move forward or backward. The main steering motor 18 is driven to turn the wheels 4, so that the automobile 1 can turn to the right or the left. The main-braking motor 17 is driven to stop the rotation of the plurality of wheels 4, so that the automobile 1 can be stopped. In this way, the automobile 1 can run carrying the sub-mobility devices 50, by using the electric power stored in the main battery 14 charged by the main charger 13 supplied with the electric power from the main electric power receiving coil 12 or the main electric power receiving connector 11.

In addition, as illustrated in FIG. 4, the electric circuit of the automobile 1 includes a control system including a main electric power monitor 31, a main electric power controller 32, a main GPS receiver 33, a main input unit 34, a main communication unit 35, a main display 36, a main sensor 37, a main route generator 38, and a main automatic driving unit 39. The main electric power controller 32, the main route generator 38, and the main automatic driving unit 39 may be implemented when a CPU 40 as a controller executes a program. The CPU 40 may be provided in the automobile 1 as an ECU. As part of the above-described main facility equipment 19, each of these components of the control system may be supplied with electric power from the main converter 15.

The main electric power monitor 31 monitors conditions of the main battery 14. The conditions of the main battery 14 include, for example, a charging voltage and a temperature. The main electric power controller 32 controls the main charger 13 and the main convertor 15, based on information from the main electric power monitor 31. The main electric power controller 32 controls to supply electric power from the main converter 15 to the sub-mobility devices 50 via the main electric power supply connector 20. For example, when the power cord is coupled to the main electric power receiving connector 11, and therefore the main charger 13 can charge the main battery 14, the main electric power controller 32 controls the charging of the main charger 13 until the voltage of the main battery 14 becomes a predetermined maximum voltage.

The main GPS receiver 33 receives a radio wave from GPS satellite. By receiving radio waves from a plurality of GPS satellites, it is possible to calculate the location of the automobile 1. Here, the main GPS receiver 33 may receive, for example, other radio waves, and acquire a corrected location of the automobile 1 based on the radio waves. The main input unit 34 is a device configured to receive the input operation of the passenger. The main communication unit 35 communicates with other devices, for example, the sub-communication unit 75 of the sub-mobility device 50 to transmit and receive data. In addition, the main communication unit 35 communicates with the base station, and therefore can acquire information on the location of the base station. The main display 36 is, for example, a liquid crystal device with touch panel. This touch panel may function as part of the main input unit 34. The liquid crystal device with touch panel is disposed on, for example, the front surface of the vehicle compartment 2. By this means, the passengers in the plurality of sub-mobility devices 50 can view the same display. The main sensor 37 is configured to detect the location, the speed, and the surrounding environment of the automobile 1. The main route generator 38 receives, for example, a destination, and therefore generates a traveling route from the present location to a stop-off point of the automobile 1. The stop-off point may be the same as the destination, or a location near the destination where the automobile 1 can be parked. The main automatic driving unit 39 outputs control signals to the main drive motor 16, the main braking motor 17 and the main steering motor 18, according to, for example, the generated traveling route. By this means, the automobile 1 can automatically move to the destination along the traveling route.

Next, collaboration control by the sub-mobility devices 50 and the automobile 1 will be described. The collaboration control may include, for example, internal charging control to supply electric power from the main buttery 14 of the automobile 1 to the sub-batteries 63 of the sub-mobility devices 50; external charging control to supply electric power from the outside of the automobile 1 to charge the main battery 14 and the sub-batteries 63; generation of a traveling route along which the automobile 1 carrying the sub-mobility devices 50 moves to stop-off points; and automatic driving control to automatically drive the automobile 1 along the generated traveling route.

With the internal charging control, the main battery 14 of the automobile 1 supplies electric power to the sub-batteries 63 of the sub-mobility devices 50. For example, when the sub-mobility device 50 gets in the automobile 1, and the sub-electric power receiving connector 61 is coupled to the main electric power supply connector 20, the main electric power controller 32 starts the internal charging control. During the internal charging control, the main electric power controller 32 checks if the sub-electric power receiving connector 61 of the sub-mobility device 50 is coupled to the main electric power supply connector 20. In addition, the main electric power controller 32 checks the amount of electric power remaining in the main battery 14. The remaining amount of electric power may be checked based on, for example, the detected voltage. Then, when the detected voltage of the main battery 14 is equal to or higher than a voltage a little higher than a predetermined minimum voltage, the main electric power controller 32 determines that the internal charging is available, and supplies part of the electric power in the main battery 14 to the sub-battery 63. The main electric power controller 32 controls the main converter 15, and starts supplying electric power from the main electric power supply connector 20. By this means, the sub-mobility device 50 is supplied with the electric power, and the sub-battery 63 is charged. Then, the main electric power controller 32 acquires the charging voltage of the sub-battery 63 of the sub-mobility device 50 via the main communication unit 35, and monitors the charging voltage. When the sub-battery 63 is charged to a predetermined necessary voltage, the main electric power controller 32 stops supplying the electric power from the main electric power supply connector 20. By this means, it is possible to charge the sub-battery 63 of the sub-mobility device 50 to the predetermined necessary voltage. Moreover, during the internal charging, the main electric power controller 32 acquires the charging voltage of the main battery 14 from the main electric power monitor 31, and monitors the charging voltage. When the charging voltage of the main battery 14 is equal to or lower than a predetermined voltage a little higher than the minimum voltage, the main electric power controller 32 stops supplying the electric power from the main electric power supply connector 20. By this internal charging control, it is possible to charge the sub-battery 63 of the sub-mobility device 50 in the automobile 1 to the extent that the amount of electric power remaining in the main battery 14 is not equal to or lower than the minimum value. Therefore, it is possible to avoid the situation where the amount of electric power stored in the automobile 1 becomes insufficient because the electric power is supplied from the automobile 1 to the sub-mobility device 50, and consequently the automobile 1 cannot move to the destination of the automobile 1.

During the external charging control, electric power is supplied from the outside of the automobile 1 to at least the main battery 14 or the sub-batteries 63 via the main electric power receiving connector 11 or the main electric power receiving coil 12, to charge at least one of the main battery 14 and the sub-batteries 63. For example, when the automobile 1 runs on the electric power transmission coil 101 provided on a charging lane of the road, the main electric power controller 32 starts the external charging control.

During the external charging control, the main electric power controller 32 first acquires the amount of electric power remaining in the main battery 14 and the amount of electric power remaining in all the sub-batteries 63. Then, the main electric power controller 32 determines whether the external charging is required based on the charged state indicated by those remaining amounts of electric power. For example, when the total amount of electric power remaining in the main battery 14 and all the sub-batteries 63 is equal to or lower than a predetermined reference value, the main electric power controller 32 determines that the external charging is required. In addition, for example, when the amounts of electric power remaining in the main battery 14 and the sub-batteries 63 are equal to or lower than respective predetermined reference values, the main electric power controller 32 determines that the external charging is required. Moreover, the main electric power controller 32 calculates the insufficient amount of electric power relative to a preset necessary amount of electric power for each of the main battery 14 and the sub-batteries 63, and determines the priority of the external charging in descending order of the insufficient amount of electric power. Here, the main electric power controller 32 may repeatedly perform the above-described process.

Then, when the external charging is available, the main electric power controller 32 supplies the main battery 14 and the sub-batteries 63 with the electric power from the outside of the automobile 1 in the determined preferential order, that is, in descending order of the insufficient amount of electric power. To charge the main battery 14, the main electric power controller 32 controls the main charger 13 to supply the main battery 14 with the electric power inputted to the main electric power receiving coil 12. To charge the sub-battery 63 of any of the sub-mobility devices 50, the main electric power controller 32 controls the main charger 13 and the main converter 15 to supply the main electric power supply connector 20 with the electric power inputted to the main electric power receiving coil 12. In this case, the electric power from the outside of the automobile 1 may be supplied to the sub-batteries 63 via the main battery 14, or may be supplied directly to the main converter 15 from the main charger 13, and supplied to the sub-batteries 63.

Figure 5:
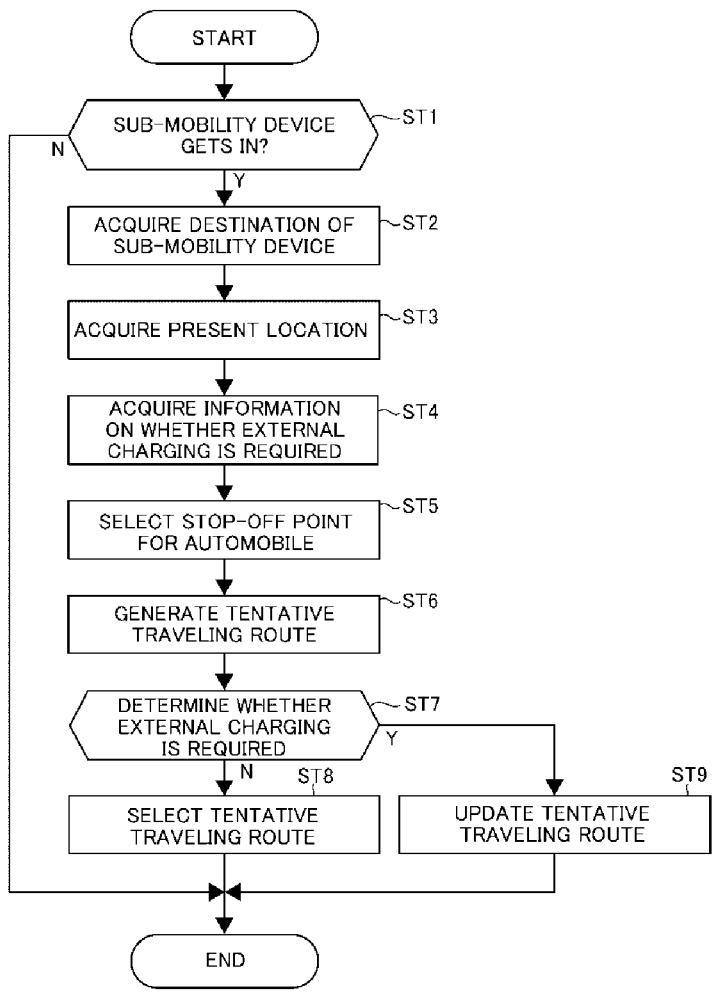
FIG. 5 is a flowchart illustrating a route generation process according to Example 1.

FIG. 5 is a flowchart illustrating a route generation process according to Example 1. With Example 1, a traveling route for the automobile 1 which is suitable for the sub-mobility devices 50 to move to destinations is generated.

As illustrated in FIG. 5, for example, when the sub-mobility devices 50 get in the automobile 1, the main route generator 38 starts a traveling route generation or update process (step ST1).

To generate the traveling route, the main route generator 38 acquires information on the destinations of the one or more sub-mobility devices 50 in the automobile 1, by using the main communication unit 35 (step ST2). The main communication unit 35 communicates with the sub-communication unit 75 of each of the sub-mobility devices 50 in the automobile 1, and acquires information on the destinations used by the sub-route generator 78 to generate the traveling route for the sub-mobility devices 50. In addition, the main route generator 38 acquires the present location from the main GPS receiver 33 (step ST3). Then, the main route generator 38 acquires information on whether the external charging is required, from the main electric power controller 32 (step ST4).

Next, the main route generator 38 selects a stop-off point corresponding to each of the destinations of the one or more sub-mobility devices 50, by using point information (step ST5). The point information may be information on a point prestored in a memory readable by the CPU 40, or information on a point acquired by the main communication unit 35. The main route generator 38 may select, for example, a point where charging is available, as the stop-off point. In addition, when there is parking space in the destination, the main route generator 38 may select the destination as the stop-off point. Then, the main route generator 38 generates a traveling route to pass through one or more stop-off points from the present location where the sub-mobility devices 50 get in the automobile 1 (step ST6). The main route generator 38 generates a tentative traveling route to pass through the one or more stop-off points, for example, in order from the point closest to the present location to the farthest one.

Figure 6:
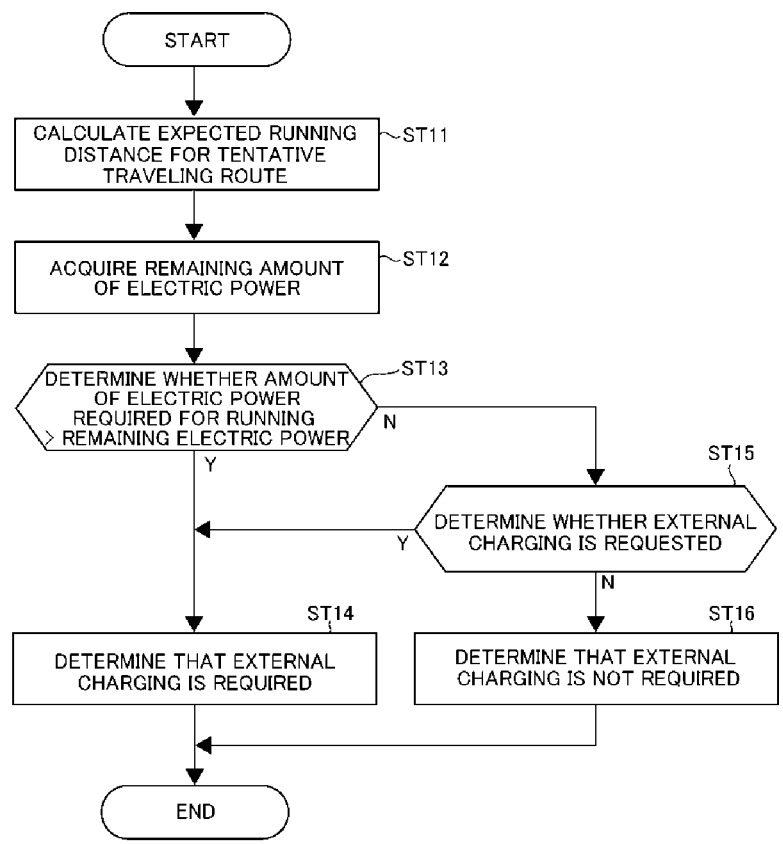
FIG. 6 is a flowchart illustrating determination of whether external charging is required according to Example 1.

Next, the main route generator 38 determines whether the external charging is required (step ST7). FIG. 6 is a flowchart illustrating the determination of whether the external charging is required according to Example 1.

To determine whether the external charging is required, the main route generator 38 first calculates an expected running distance (expected running load) of the automobile 1, and an expected running distance (expected running load) of each of the sub-mobility devices 50 for the traveling route tentatively generated (step ST11). In addition, the main route generator 38 acquires the amount of electric power remaining in the automobile 1 and the amount of electric power remaining in each of the sub-mobility devices 50 (step ST12). Then, the main route generator 38 determines whether the remaining amount of electric power is equal to or lower than an amount of expected electric power which is required for the expected running distances (expected running loads) (step ST13). For example, when the total amount of electric power remaining in the main battery 14 and the sub-batteries 63 is equal to or lower than the necessary amount of electric power based on the total expected running distance of the automobile 1 and the sub-mobility devices 50, the main route generator 38 determines that the external charging is required (step ST14). In addition, when, for example, the amounts of electric power remaining in the main battery 14 and the sub-batteries 63 are equal to or lower than the necessary amounts of electric power based on the expected running distances of the automobile 1 and the sub-mobility devices 50, respectively, the main route generator 38 determines that the external charging is required (step ST14). Moreover, when the external charging is previously requested in the information on whether the external charging is required, which is previously acquired from the main electric power controller 32 (step ST15), the main route generator 38 determines that the external charging is required (step ST14).

When none of those are applicable, the main route generator 38 determines that the external charging is not required (step ST16). In this case, as illustrated in FIG. 5, the main route generator 38 selects the tentative traveling route as an actual traveling route (step ST8).

On the other hand, when the external charging is required, the main route generator 38 calculates the total amount of insufficient electric power in the main battery 14 and the sub-batteries 63, selects one or more running lanes 100 corresponding to the calculated amount of insufficient electric power, as designated routes, and changes part of the tentative traveling route to pass through the selected running lanes 100 (step ST9). By this means, when the total remaining amount of electric power is insufficient for the total expected running distance, it is possible to generate a traveling route to pass through a road or a point where the external charging is available as an actual traveling route. Here, the main route generator 38 may select a location where charging is available instead of the running lane 100, and change the tentative traveling route in the same way as described above.

During the automatic driving control, the automobile 1 is controlled to automatically drive along the traveling route generated by the main route generator 38. The main automatic driving unit 39 first acquires the traveling route from the main route generator 38. Then, the main automatic driving unit 39 controls the main drive motor 16, the main steering motor 18, and the main braking motor 17, periodically checking the present location acquired from the main GPS receiver 33, and checking the location, the speed and the surrounding environment of the automobile 1 detected by the main sensor 37. By this means, the automobile 1 is automatically driven to pass through one or more stop-off points from the present location along the traveling route generated by the main route generator 38. In addition, the main automatic driving unit 39 causes the main electric power controller 32 to perform the external charging control, when the automobile 1 runs on the running lane 100 where charging is available, or when the automobile 1 stops at a stop-off point.

Figure 7:
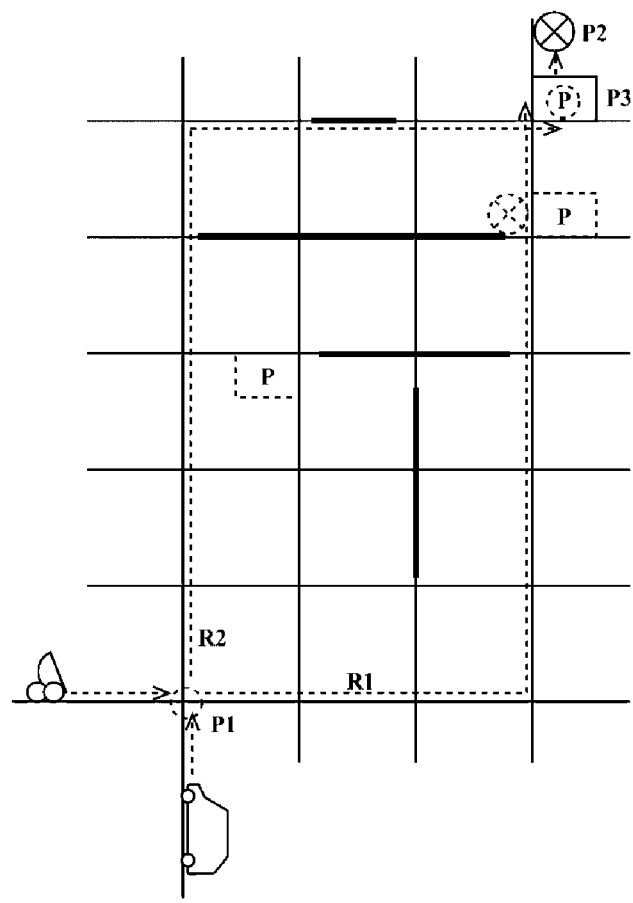
FIG. 7 illustrates an exemplary traveling route generated by the processes illustrated in FIGS. 5 and 6.

FIG. 7 illustrates an exemplary traveling route generated by the processes illustrated in FIG. 5 and FIG. 6. FIG. 7 illustrates an example where one sub-mobility device 50 gets in the automobile 1 at a point P1 in the lower left of a schematic map, and is moved to a destination P2 in the upper light of the map. In this case, a parking space P near the destination P2 is selected as a stop-off point P3 and a tentative traveling route R1 is generated. In addition, when predetermined external charging is required, the tentative traveling route R1 is updated to, for example, a traveling route R2.

With the present example, as described above, the automobile 1 runs along the traveling route corresponding to the destinations of the sub-mobility devices 50 carried in the automobile 1, and moves to each of the stop-off points. In addition, it is possible to charge the sub-mobility devices 50 in the automobile 1 if necessary. Then, with the present example, when the external charging is required depending on the entire charged state of the main battery 14 of the automobile 1 and the sub-batteries 63 of the sub-mobility devices 50, a traveling route is generated or selected to pass through a road or a point where electric power can be supplied to the main electric power receiving coil 12 from the outside of the automobile 1. Therefore, even when the sub-mobility devices 50 require a relatively large amount of electric power, it is possible to charge the sub-batteries 63 of the sub-mobility devices 50 carried in the automobile 1 from the outside of the automobile 1 without reducing the electric power in the main battery 14 of the automobile 1.

With the present embodiment, when the total amount of electric power remaining in the main battery 14 and the sub-batteries 63 is equal to or lower than the necessary amount of electric power based on the total expected running distance of the automobile 1 and the sub-mobility devices 50, it is possible to determine that the external charging is required, and to generate a traveling route to pass through a road or a point where the automobile 1 can be supplied with electric power, based on the determination result. Therefore, when the total amount of electric power is insufficient for the total expected running distance of the automobile 1 and the sub-mobility devices 50, it is possible to generate the traveling route to pass through a road or a point where the automobile 1 can be supplied with electric power.

With the present example, when the amounts of electric power remaining in the main battery 14 and the sub-batteries 63 are equal to or lower than the necessary amounts of electric power based on the expected running distances of the automobile 1 and the sub-mobility devices 50, respectively, it is possible to determine that the external charging is required, and to generate or select a traveling route to pass through a road or a point where the automobile 1 can be supplied with electric power, based on the determination result. Therefore, when the electric power is insufficient for each of the expected running distances, it is possible to generate the traveling route to pass through a road or a point where the automobile 1 can be supplied with electric power.

EXAMPLE 2

Next, the sub-mobility device charging system for the automobile 1 according to Example 2 of the present invention will be described. For the same components as those in Example 1, the same names, descriptions, and illustrations as in Example 1 are used. Hereinafter, differences from Example 1 will be mainly described.

Figure 8:
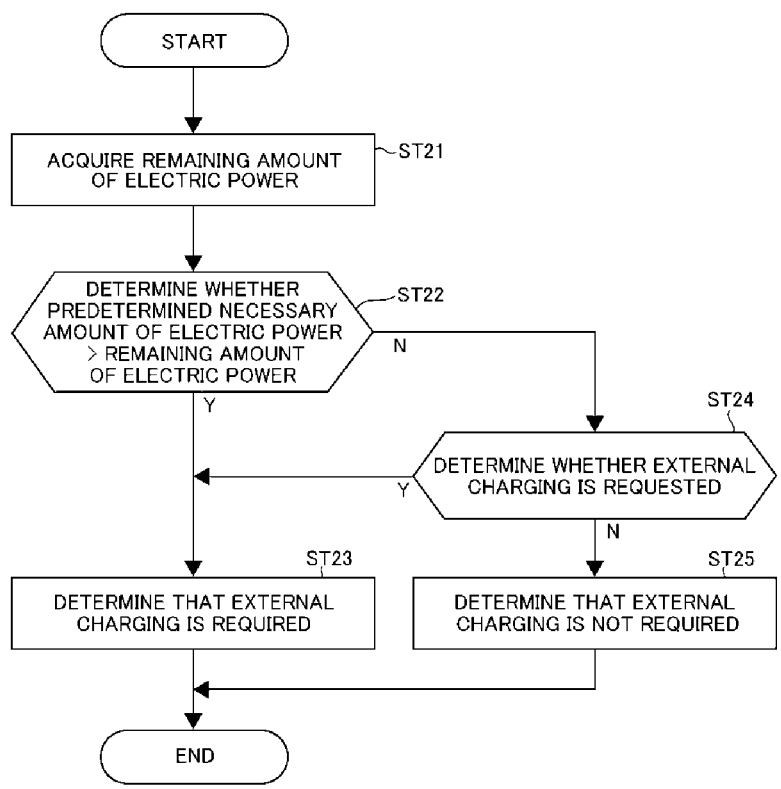
FIG. 8 is a flowchart illustrating determination of whether external charging is required according to Example 2.

FIG. 8 is a flowchart illustrating determination of whether the external charging is required according to Example 2. FIG. 8 corresponds to FIG. 6.

To determine whether the external charging is required, the main route generator 38 first acquires the amount of electric power remaining in the automobile 1 and the amount of electric power remaining in each of the sub-mobility devices 50 (step ST21).

Then, the main route generator 38 determines whether the acquired remaining amounts of electric power are equal to or lower than respective predetermined necessary amounts of electric power, respectively (step ST22). These remaining amounts of electric power may be values which are prescribed for the normal running for the automobile 1 and the sub-mobility devices 50, respectively. For example, when the total amount of electric power remaining in the main battery 14 and the sub-batteries 63 is equal to or lower than a predetermined necessary amount of electric power, the main route generator 38 determines that the external charging is required (step ST23). In addition, when, for example, the amounts of electric power remaining in the main battery 14 and the sub-batteries 63 are equal to or lower than respective predetermined necessary amounts of electric power, the main route generator 38 determines that the external charging is required (step ST23).

Moreover, when the external charging is previously requested in the information on whether the external charging is required, which is previously acquired from the main electric power controller 32 (step ST24), the main route generator 38 determines that the external charging is required (step ST23). In this case, the main route generator 38 changes part of the traveling route tentatively generated to pass through the selected running lane 100.

When none of those are applicable, the main route generator 38 determines that the external charging is not required (ST25). In this case, the main route generator 38 selects the tentative traveling route as an actual traveling route.

As described above, with the present embodiment, when the total amount of electric power remaining in the main battery 14 and the sub-batteries 63 is equal to or lower than the necessary amount of electric power of the automobile 1 and the sub-mobility devices 50, it is possible to generate or select a traveling route to pass through the running lane 100 of a road or a point where the automobile 1 can be supplied with electric power, based on the determination result that the external charging is required. Therefore, when the total amount of electric power is lower than the necessary amount of electric power of the automobile 1 and the sub-mobility devices 50, it is possible to generate a traveling route to pass through a road or point where the automobile 1 can be supplied with electric power. With the present embodiment, when the amounts of electric power remaining in the main battery 14 and the sub-batteries 63 are equal to or lower than the necessary amounts of electric power based on the expected running distances of the automobile 1 and the sub-mobility devices 50, respectively, the controller generates or selects a traveling route to pass through a road or a point where the automobile 1 can be supplied with electric power, based on the determination result that the external charging is required. Therefore, even when the remaining amounts of electric power are lower than the respective necessary amounts of electric power, it is possible to generate the traveling route to pass through a road or a point where the automobile 1 can be supplied with electric power.

EXAMPLE 3

Next, the sub-mobility device charging system for the automobile 1 according to Example 3 will be described. For the same components as those in Example 1, the same names, descriptions, and illustrations as in Example 1 are used. Hereinafter, differences from Example 1 will be mainly described.

Figure 9:
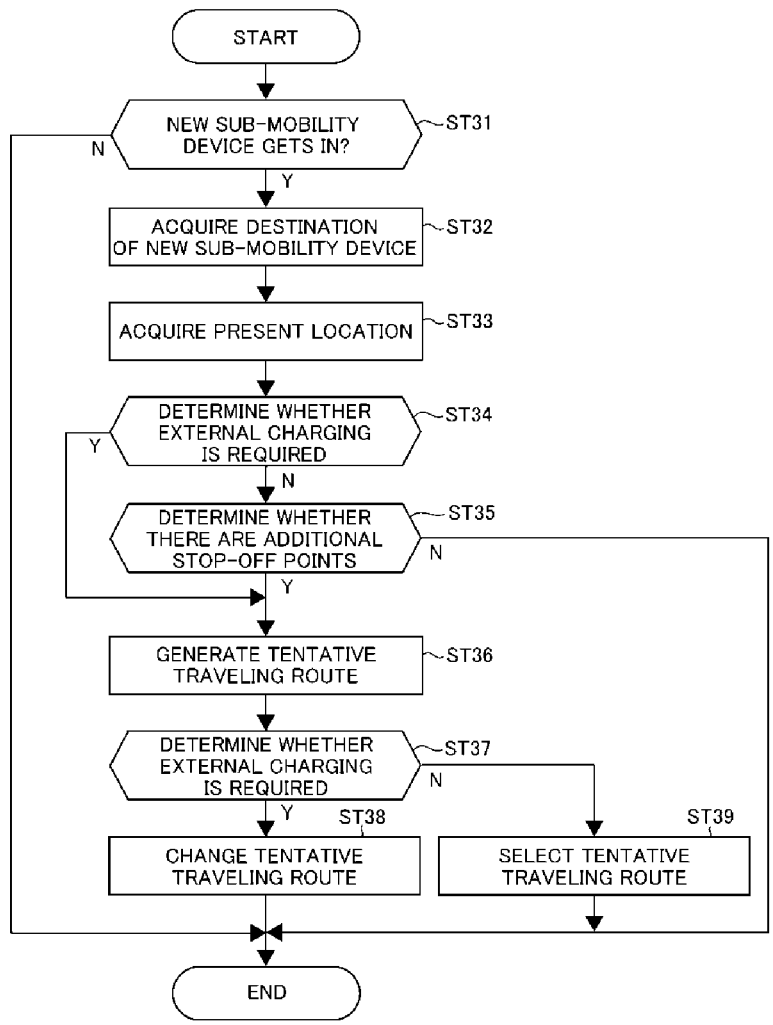
FIG. 9 is a flowchart illustrating a route generation process according to Example 3.

FIG. 9 is a flowchart illustrating a route generation process according to Example 3. With Example 3, a traveling route for the automobile 1 which is suitable for the sub-mobility devices 50 to move to destinations is generated.

As illustrated in FIG. 9, for example, when one or more new sub-mobility devices 50 get in the automobile 1, the main route generator 38 starts a traveling route generation or update process (step ST31). To generate the traveling route, the main route generator 38 acquires information on the destinations of the new sub-mobility devices 50 in the automobile 1, by using the main communication unit 35 (step ST32). The main communication unit 35 communicates with the sub-communication unit 75 of each of the new sub-mobility devices 50 in the automobile 1, and acquires information on the destinations used by the sub-route generator 78 to generate the traveling route for the sub-mobility devices 50. In addition, the main route generator 38 acquires the present location from the main GPS receiver 33 (step ST33).

Next, the main route generator 38 acquires information on whether the external charging is required from the main electric power controller 32, or determines whether the external charging is required by, for example, the process illustrated in FIG. 6 or FIG. 8 to determine whether additional external charging is required for the new sub-mobility devices 50. Moreover, the main route generator 38 selects a stop-off point for the destination for each of the new sub-mobility devices 50.

Then, when the external charging is required for the new sub-mobility devices 50 (step ST34), or when stop-off points are added for the new sub-mobility devices 50 (step ST35), the main route generator 38 generates a traveling route to pass through one or more stop-off points including the additional stop-off points from the present location (step ST36). The main route generator 38 generates a tentative traveling route to pass through one or more stop-off points, for example, in order from the point closest to the present location to the farthest one.

In addition, the main route generator 38 determines whether additional charging is required (step ST37), and, when determining that the additional charging is required, changes part of the tentative traveling route to pass through the running lane 100 (step ST38). The main route generator 38 selects the tentative traveling route newly generated, or the tentative traveling route having been changed, as an actual traveling route (step ST39).

By this means, the main route generator 38 can determine again whether the external charging is required, in consideration of the amount of electric power remaining in the new sub-mobility devices 50, and, when determining that the external charging is required, generates the traveling route to pass through a road with a lane for supplying electric power. Here, for example, when any stop-off point is not added but additional external charging is required, the main route generator 38 may calculate in advance a plurality of traveling routes where the amounts of electric power which can be received by the main electric power receiving coil 12 are different from each other, and select one from the traveling routes which corresponds to the additional or the total amount of the external charging. In this case, the automobile 1 can start running along the traveling route just after the sub-mobility devices 50 get in the automobile 1 without generating a traveling route every time a new sub-mobility device 50 gets in the automobile 1.

EXAMPLE 4

Next, the sub-mobility device charging system for the automobile 1 according to Example 4 will be described. For the same components as those in Example 1, the same names, descriptions, and illustrations as in Example 1 are used. Hereinafter, differences from Example 1 will be mainly described.

Figure 10:
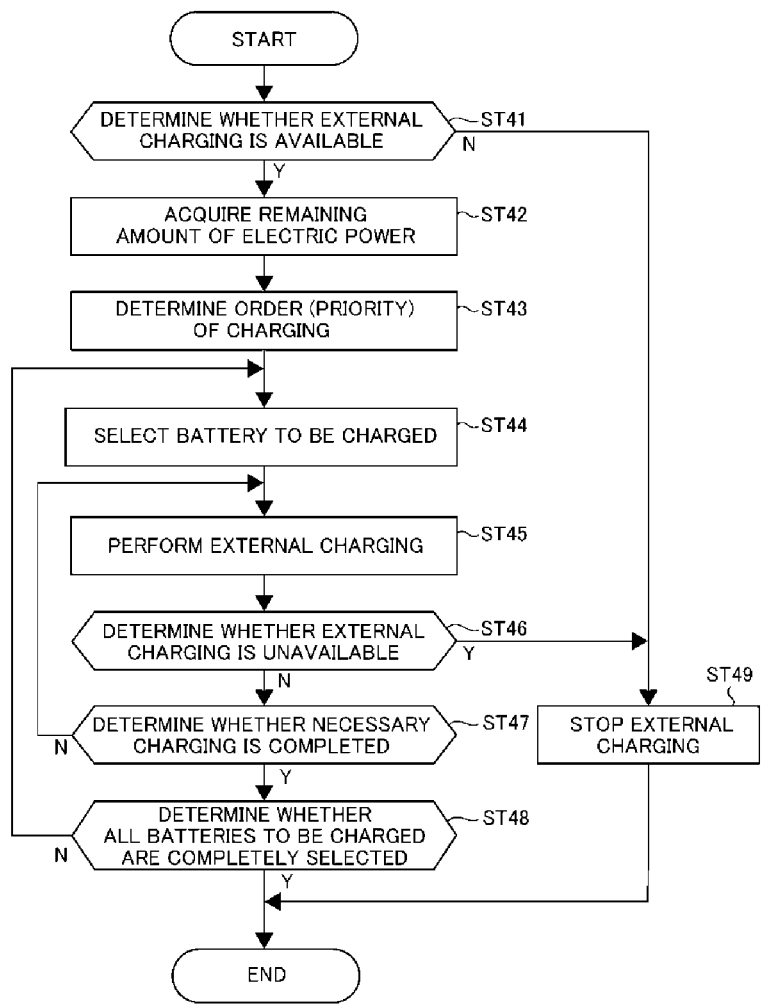
FIG. 10 is a flowchart illustrating external charging control according to Example 4.

FIG. 10 is a flowchart illustrating external charging control according to Example 4. During the external charging control, electric power is supplied from the outside of the automobile 1 to at least the main battery 14 or the sub-batteries 63 via the main electric power receiving connector 11 or the main electric power receiving coil 12, to charge at least one of the main battery 14 or the sub-batteries 63.

As illustrated in FIG. 10, when the automobile 1 runs on the electric power transmission coil 101 provided on a charging lane of the road, the main electric power controller 32 determines that the external charging is available, and starts the external charging control (step ST41). Here, the main electric power controller 32 may determine that the external charging is available, based on a notice from the main electric power controller 32, and start the external charging control.

During the external charging control, the main electric power controller 32 first acquires the amount of electric power remaining in the main battery 14 and the amount of electric power remaining in all the sub-batteries 63 (step S42). Then, the main electric power controller 32 determines whether the external charging is required, and determines the order of charging (step ST43). Basically, the main electric power controller 32 calculates the ratio of electric power shortage as the electric power condition of each of the main battery 14 and the sub-batteries 63, and determines the priority of charging to charge the batteries in descending order of the ratio of electric power shortage. In addition, when it is not possible to charge the sub-mobility device 50 which requires to be charged because the sub-mobility device 50 is scheduled to get out of the automobile 1 before being charged in this order, the main electric power controller 32 raises the priority of the sub-battery 63 of the sub-mobility device 50. Meanwhile, when the amount of electric power remaining in the automobile 1 is lower than a reference value, the main electric power controller 32 gives the top priority to the automobile 1.

Next, the main electric power controller 32 supplies the electric power from the outside of the automobile 1 to the main battery 14 or a predetermined sub-battery 63 according to the priority. The main electric power controller 32 selects the battery to be charged first (step ST44), and performs the external charging (step ST45). In addition, the main electric power controller 32 determines whether the necessary charging is completed (step ST47). Then, after the necessary charging is completed, the main electric power controller 32 determines whether selection for all the batteries to be charged is completed (step ST48), and, when determining that the selection is not completed, selects the next battery to be charged (step ST44), and performs the external charging (step ST45). The main electric power controller 32 repeats the above-described process until the external charging is completed for all the batteries to be charged. Moreover, when it is not possible to continue the external charging because, for example, the automobile 1 is out of the charging lane during the external charging, the main electric power controller 32 determines that it is not possible to perform the external charging (step ST46), and stops the external charging (step ST49).

As described above, with the present example, it is possible to perform the external charging according to the priority such that the main battery 14 and the sub-batteries 63 are charged in descending order of the ratio of electric power shortage. Therefore, it is possible to preferentially charge the battery with the highest rate of electric power shortage among the main battery 14 and the sub-batteries 63.

In addition, the sub-battery 63 of the sub-mobility device 50 which is scheduled to get out of the automobile 1 earlier than other sub-mobility devices 50 is preferentially charged. Therefore, each of the sub-mobility devices 50 is not likely to miss a chance to be charged in the automobile 1.

Moreover, when the amount of electric power remaining in the automobile 1 is lower than the reference value, the automobile 1 is preferentially charged over the sub-mobility devices 50. Therefore, it is possible to avoid the situation where the automobile 1 runs with the amount of electric power lower than the reference value. Moreover, the main battery 14 of the automobile 1 having a large capacity is preferentially charged from the outside of the automobile 1. After that, the main battery 14 can distribute the electric power to the sub-batteries 63 of the sub-mobility devices 50 by performing the internal charging. For the automobile 1, a charging system suitable for charging the main battery 14 is usually adopted. Therefore, it is possible to efficiently supply a larger amount of electric power to the automobile 1 at a short time than when the sub-batteries 63 are charged.

While the above-described examples are preferred examples of the present invention, it is to be understood that the invention is not limited to these examples. The present invention is intended to cover various modification and alteration without departing from the spirit and scope of the present invention.

The invention claimed is:

1. A sub-mobility device charging system for a vehicle capable of moving while carrying a sub-mobility device in which a passenger sits, the system comprising:

a main electric power supply unit configured to supply electric power from the vehicle to the sub-mobility device carried in the vehicle;

a main electric power receiving unit configured to receive electric power from an outside of the vehicle;

a main battery configured to be charged by supplying electric power to the main electric power receiving unit to the main battery;

a main electric power supply circuit configured to supply the main electric power supply unit with the electric power supplied to the main electric power receiving unit or the electric power stored in the main battery; and a controller configured to control to supply the electric power from the main electric power supply circuit to the sub-mobility device via the main electric power supply unit, and to calculate a traveling route for the vehicle running while carrying the sub-mobility device, wherein when external charging is required depending on a total amount of the electric power stored in the main battery of the vehicle and a sub-battery of the sub-mobility device, the controller generates or selects a traveling route to pass through a road or a point where the main electric power receiving unit can be supplied with electric power from the outside of the vehicle.

2. The system according to claim 1, wherein:

the main electric power receiving unit is configured to receive electric power from an electric power supply lane provided on a road on which the vehicle can run; and when the external charging is required, the controller generates or select the traveling route to pass through the road with the electric power supply lane.

3. The system according to claim 1, wherein the controller generates or select the traveling route to pass through a road or a point where electric power supply is available, on a basis of a result of determination of whether the external charging is required depending on expected running distances of the vehicle and the sub-mobility device.

4. The system according to claim 3, wherein when a total amount of electric power remaining in the main battery and the sub-battery is equal to or lower than a necessary amount of electric power on a basis of a total expected running distance of the vehicle and the sub-mobility device, the controller generates or selects the traveling route to pass through a road or a point where electric power supply is available on a basis of a result of determination that the external charging is required.

5. The system according to claim 3, wherein when amounts of electric power remaining in the main battery and the sub-battery are equal to or lower than necessary amounts of electric power based on the expected running distances of the vehicle and the sub-mobility device, respectively, the controller generates or selects the traveling route to pass through a road or a point where electric power supply is available on a basis of a result of determination that the external charging is required.

6. The system according to claim 3, wherein when a total amount of electric power remaining in the main battery and the sub-battery is equal to or lower than a necessary amount of electric power of the vehicle and the sub-mobility device, the controller generates or selects the traveling route to pass through a road or a point where electric power supply is available, on a basis of a result of determination that the external charging is required.

7. The system according to claim 1, wherein when a new sub-mobility device gets in the vehicle, the controller determines again whether the external charging is required in consideration of an amount of electric power remaining in the new sub-mobility device, and, when the external charging is required, the controller generates or selects the traveling route to pass through a road with an electric power supply lane.

8. The system according to claim 7, wherein when the new sub-mobility device gets in the vehicle, the controller selects a traveling route corresponding to the amount of electric power remaining in the new sub-mobility, from among a plurality of different traveling routes having already been generated where amounts of electric power which can be received by the main electric power receiving unit are different from each other.

9. The system according to claim 1, wherein the controller determines an order of charging, taking into account an electric power state of each of the main battery and the sub-battery.

10. The system according to claim 9, wherein the controller determines the order of charging to charge the main battery and the sub-battery in descending order of a rate of electric power shortage.

11. The system according to claim 9, wherein when the vehicle carries multiple sub-mobility devices, the controller preferentially charges the sub-battery of one of the sub-mobility devices which is scheduled to get out of the vehicle earlier than other sub-mobility devices.

12. The system according to claim 9, wherein when an amount of electric power remaining in the vehicle is lower than a reference value, the controller preferentially charges the vehicle over the sub-mobility device.

13. A sub-mobility device charging system for a vehicle capable of moving while carrying a sub-mobility device in which a passenger sits, the system comprising:
   a main electric power supply unit configured to supply electric power from the vehicle to the sub-mobility device carried in the vehicle;
   a main electric power receiving unit configured to receive electric power from an outside of the vehicle;
   a main battery configured to be charged by supplying electric power to the main electric power receiving unit to the main battery;
   a main electric power supply circuit configured to supply the main electric power supply unit with the electric power supplied to the main electric power receiving unit or the electric power stored in the main battery; and
   a controller configured to control to supply the electric power from the main electric power supply circuit to the sub-mobility device via the main electric power supply unit,
   wherein the controller sums an amount of charging for the main battery of the vehicle and an amount of charging for a sub-battery of the sub-mobility device.

14. A sub-mobility device charging system for a vehicle capable of moving while carrying a sub-mobility device in which a passenger sits, the system comprising:
   a main electric power supply unit configured to supply electric power from the vehicle to the sub-mobility device carried in the vehicle;
   a main electric power receiving unit configured to receive electric power from an outside of the vehicle;
   a main battery configured to be charged by supplying electric power to the main electric power receiving unit to the main battery;
   a main electric power supply circuit configured to supply the main electric power supply unit with the electric power supplied to the main electric power receiving unit or the electric power stored in the main battery; and
   a controller configured to control to supply the electric power from the main electric power supply circuit to the sub-mobility device via the main electric power supply unit,
   wherein the controller individually determines an amount of charging for the main battery of the vehicle and an amount of charging for a sub-battery of the sub-mobility device.

* * * * *